(12) United States Patent
Yenser et al.

(10) Patent No.: US 10,047,725 B2
(45) Date of Patent: Aug. 14, 2018

(54) LADDER ATTACHMENT SYSTEM FOR A WIND TURBINE

(71) Applicant: General Electric Company, Schenectady, NY (US)

(72) Inventors: Ronald Lawrence Yenser, Simpsonville, SC (US); James Eric Reed, Spartanburg, SC (US)

(73) Assignee: General Electric Company, Schenectady, NY (US)

( * ) Notice: Subject to any disclaimer, the term of this patent is extended or adjusted under 35 U.S.C. 154(b) by 106 days.

(21) Appl. No.: 14/880,348

(22) Filed: Oct. 12, 2015

(65) Prior Publication Data
US 2017/0101823 A1    Apr. 13, 2017

(51) Int. Cl.
*F03D 13/20* (2016.01)
*E06C 1/34* (2006.01)
*F03D 80/80* (2016.01)
*E06C 7/08* (2006.01)
*E06C 9/02* (2006.01)

(52) U.S. Cl.
CPC ............... *F03D 13/20* (2016.05); *E06C 1/34* (2013.01); *E06C 7/082* (2013.01); *E06C 7/086* (2013.01); *E06C 9/02* (2013.01); *F03D 80/80* (2016.05); *F05B 2240/912* (2013.01); *Y02E 10/728* (2013.01)

(58) Field of Classification Search
CPC ..... E06C 9/00; E06C 9/02; E06C 9/08; E06C 7/083; E06C 7/10; E06C 7/086; E06C 1/58; F03D 1/003; E04G 3/30
See application file for complete search history.

(56) References Cited

U.S. PATENT DOCUMENTS 2,998,863 A * 9/1961 Larson ............... E06C 1/56
182/164
3,059,721 A * 10/1962 Straw ............... E06C 1/34
182/13

(Continued)

FOREIGN PATENT DOCUMENTS

CA    2228729 A1 * 7/1999 ............. E06C 7/182
CA    2228729 A1 * 7/1999 ............. E06C 7/182

(Continued)

*Primary Examiner* — Katherine W Mitchell
*Assistant Examiner* — Candace L Bradford
(74) *Attorney, Agent, or Firm* — Dority & Manning, P.A.

(57) ABSTRACT

The present disclosure is directed to a ladder attachment system for securing a ladder within a tower of a wind turbine. The ladder has parallel legs and a plurality of rungs arranged perpendicularly between the parallel legs. The ladder attachment system includes at least one external stiffener configured at a top end of each of the parallel legs. Each of the external stiffeners includes a longitudinal body having an open cross-section configured to receive one of the parallel legs along a length thereof. Further, the ladder attachment system also includes a load-bearing bracket assembly configured with each of the external stiffeners. In addition, the ladder attachment system includes at least one support arm arranged in a horizontal plane and configured with each of the parallel legs, with the support arms being spaced apart from the load-bearing bracket assembly along a height of the ladder.

19 Claims, 10 Drawing Sheets

(56) References Cited

U.S. PATENT DOCUMENTS

| | | | | | |
|---|---|---|---|---|---|
| 3,968,857 | A | * | 7/1976 | Bryan | E06C 7/006 182/106 |
| 4,060,150 | A | * | 11/1977 | Hughes | E06C 1/10 182/151 |
| 4,067,412 | A | * | 1/1978 | Jackson | E02B 3/068 182/115 |
| 4,386,487 | A | * | 6/1983 | Scott | E06C 9/02 182/93 |
| 5,024,291 | A | * | 6/1991 | Price | E06C 9/08 182/207 |
| 5,343,977 | A | * | 9/1994 | Bryan | E06C 7/006 182/106 |
| 5,423,397 | A | * | 6/1995 | Boughner | E06C 7/44 182/107 |
| 5,769,181 | A | * | 6/1998 | Gussow | E04G 1/30 182/117 |
| 6,907,957 | B1 | * | 6/2005 | Couch | E02D 17/08 182/106 |
| 7,982,330 | B1 | * | 7/2011 | Ueno | F03D 13/20 290/44 |
| 2002/0012582 | A1 | * | 1/2002 | Kirkegaard | H02G 7/00 415/4.3 |
| 2002/0047277 | A1 | * | 4/2002 | Willis | E02D 27/42 290/55 |
| 2003/0051943 | A1 | * | 3/2003 | Matty | E04G 1/20 182/117 |
| 2003/0147753 | A1 | * | 8/2003 | Ollgaard | E04H 12/085 416/244 A |
| 2008/0078128 | A1 | * | 4/2008 | Livingston | F03D 13/10 52/40 |
| 2011/0162865 | A1 | * | 7/2011 | Ueno | H02G 11/00 174/79 |
| 2012/0080266 | A1 | * | 4/2012 | Brock | E04G 3/243 182/107 |
| 2012/0222915 | A1 | * | 9/2012 | Blaska | E06C 7/505 182/97 |
| 2013/0081252 | A1 | * | 4/2013 | Markgraf | F03D 11/005 29/432 |
| 2013/0299277 | A1 | * | 11/2013 | Kyatham | E06C 9/02 182/129 |
| 2015/0226002 | A1 | * | 8/2015 | Johansen | E06C 7/12 182/217 |
| 2015/0292175 | A1 | * | 10/2015 | Kramer | E02B 17/027 405/211.1 |
| 2015/0316035 | A1 | * | 11/2015 | Doucet | E04H 12/08 52/651.07 |
| 2015/0361679 | A1 | * | 12/2015 | Kent | E04G 3/20 52/40 |
| 2016/0215520 | A1 | * | 7/2016 | Samuelsen | E04H 12/08 |
| 2017/0009747 | A1 | * | 1/2017 | Johnson | F03D 13/20 |
| 2017/0058604 | A1 | * | 3/2017 | Minette | E06C 7/48 |
| 2017/0096856 | A1 | * | 4/2017 | Libert | A62B 35/0068 |

FOREIGN PATENT DOCUMENTS

| | | | | |
|---|---|---|---|---|
| CA | 2876633 A1 | * | 7/2015 | E06C 1/06 |
| CA | 2876633 A1 | * | 7/2015 | E06C 1/06 |
| DE | 10201965 A1 | * | 7/2003 | A63B 27/00 |
| DE | 10201965 A1 | * | 7/2003 | A63B 27/00 |
| EP | 0974728 A1 | * | 1/2000 | E06C 7/006 |
| EP | 0974728 A1 | * | 1/2000 | E06C 7/006 |
| GB | 1595493 A | * | 8/1981 | E02D 29/12 |
| GB | 1595493 A | * | 8/1981 | E02D 29/12 |
| WO | WO 02/38953 A2 | | 5/2002 | |
| WO | WO 2014108134 A1 | * | 7/2014 | E06C 7/082 |
| WO | WO-2014108134 A1 | * | 7/2014 | E06C 7/082 |

\* cited by examiner

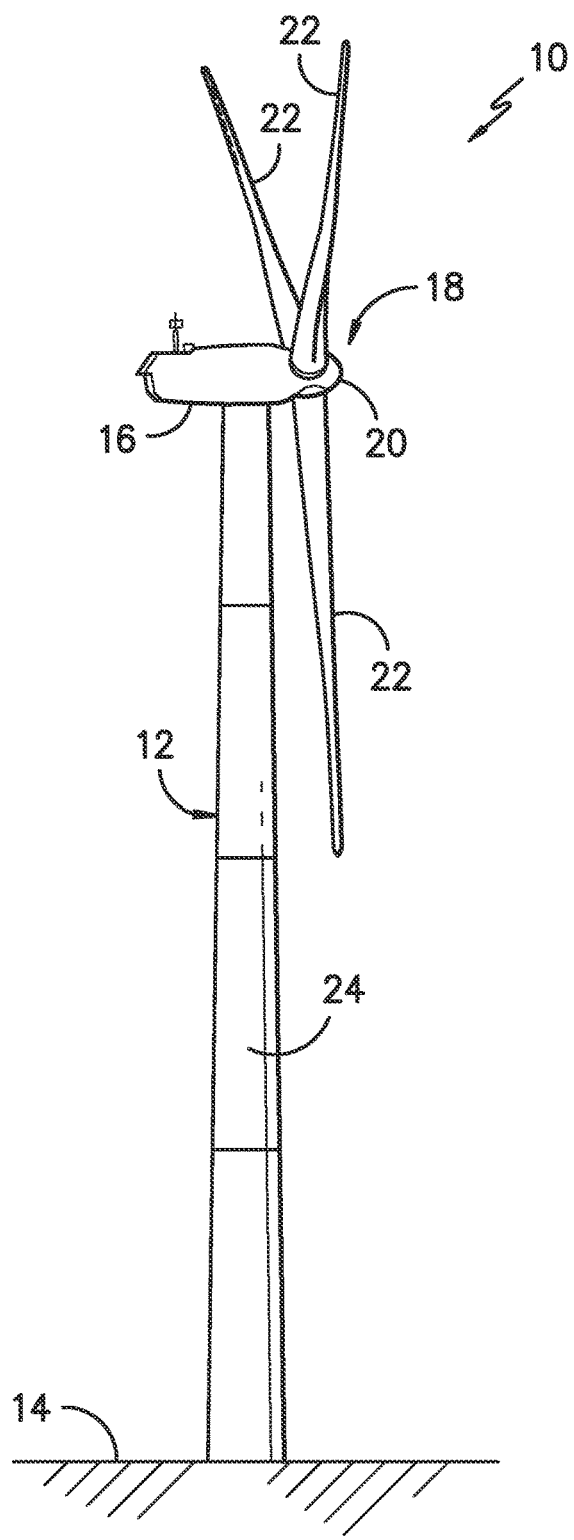
FIG. -1-

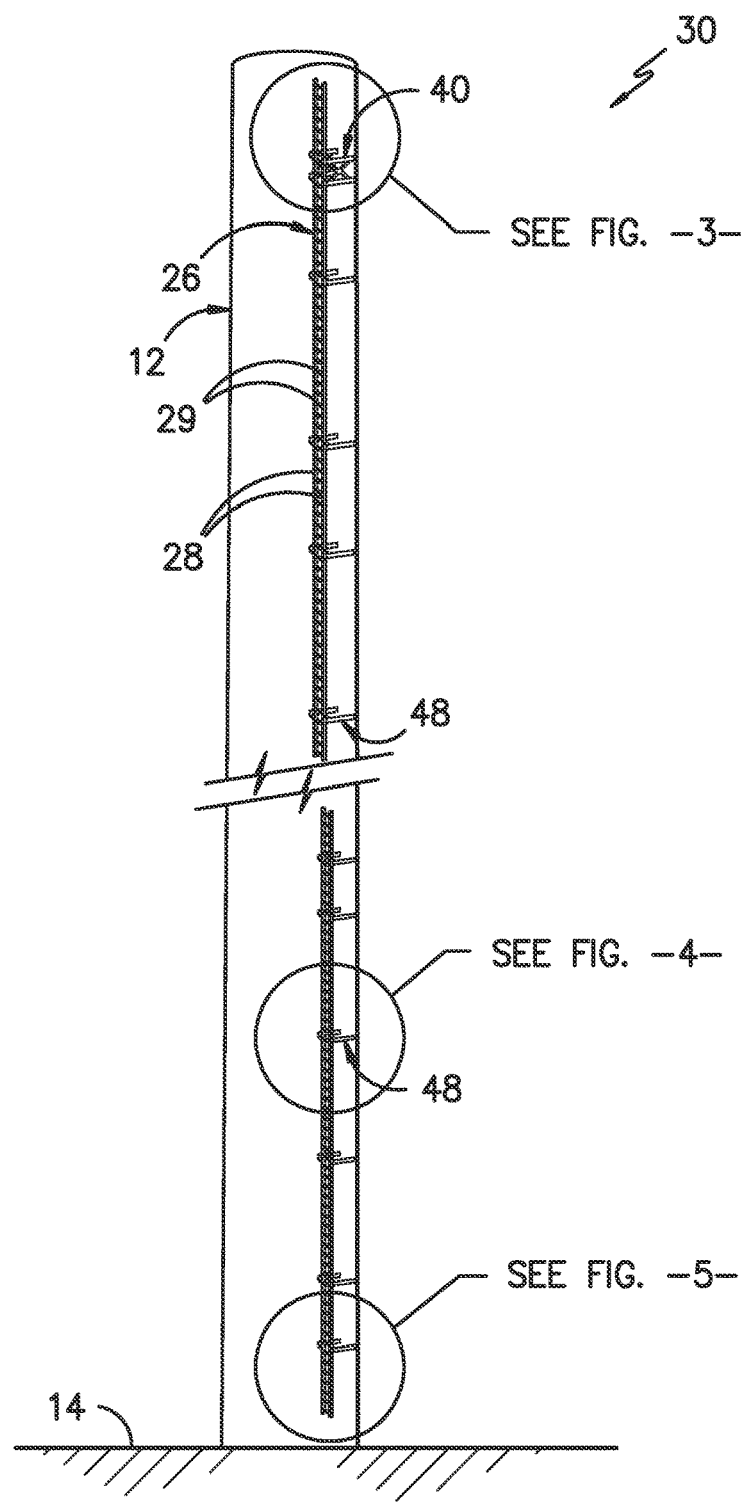
FIG. -2-

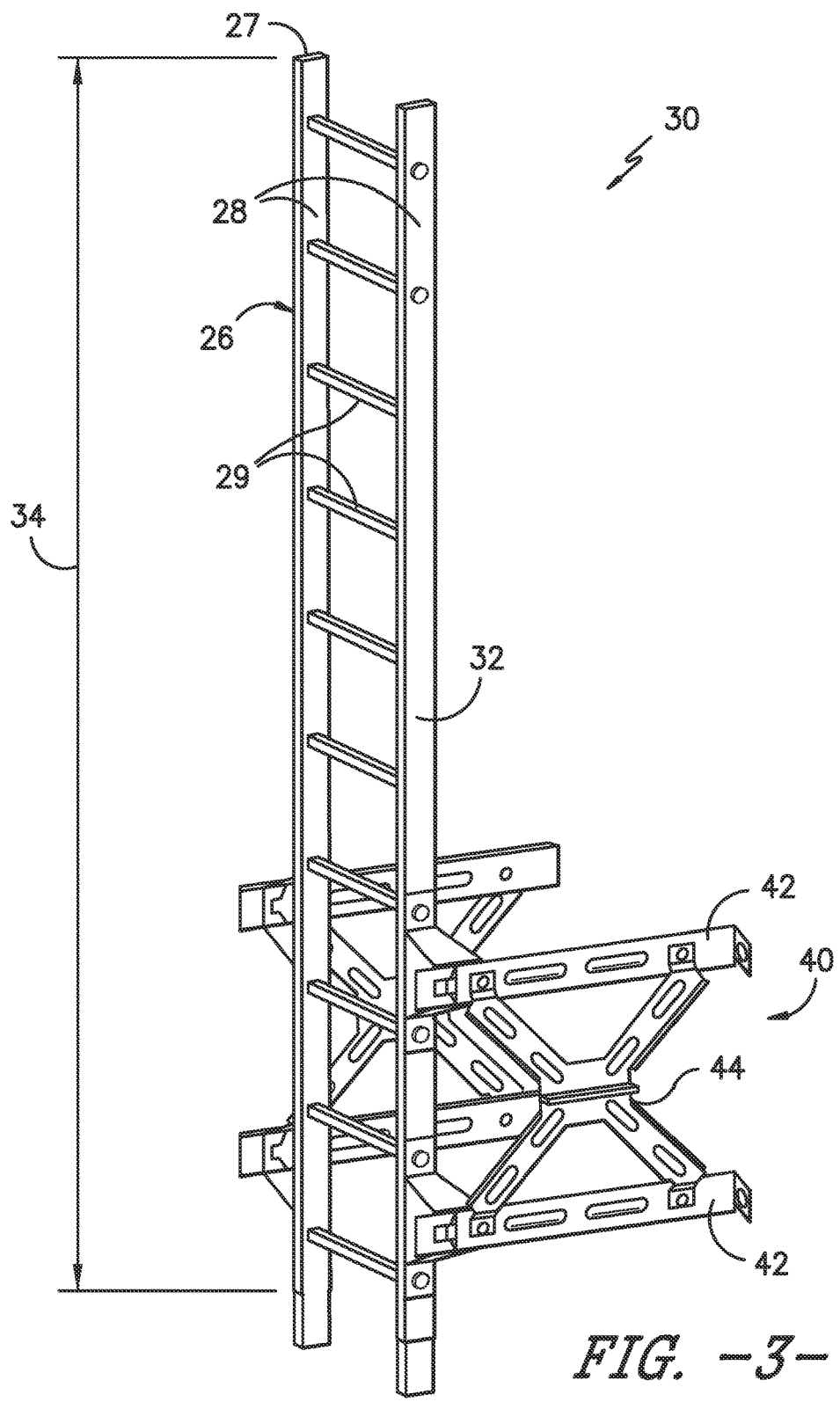
FIG. -3-

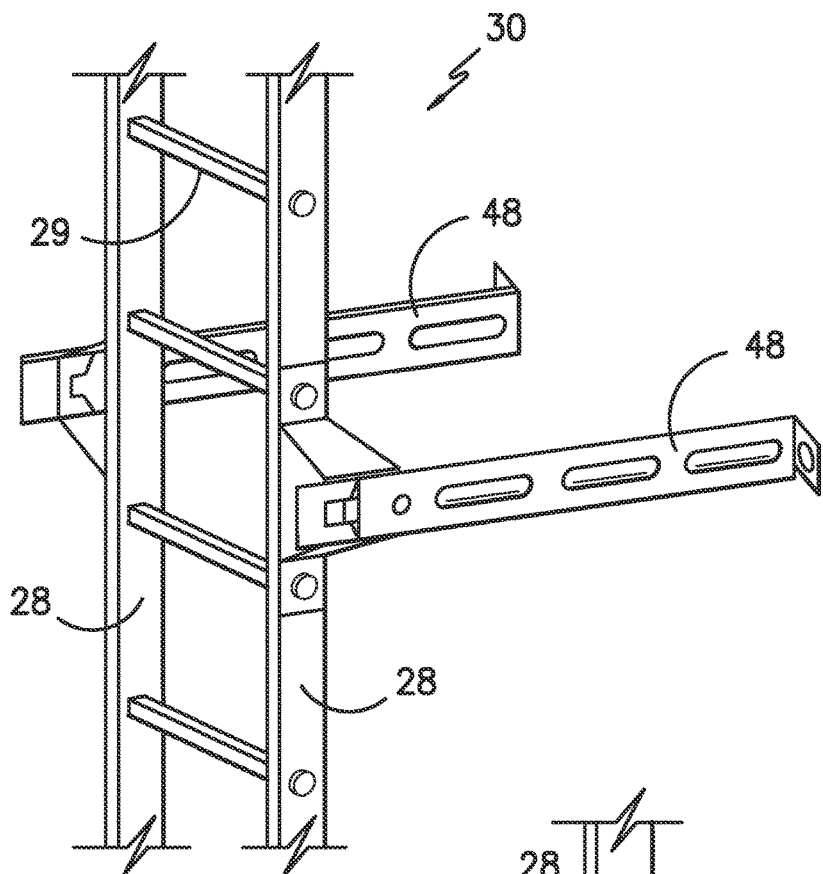
FIG. -4-
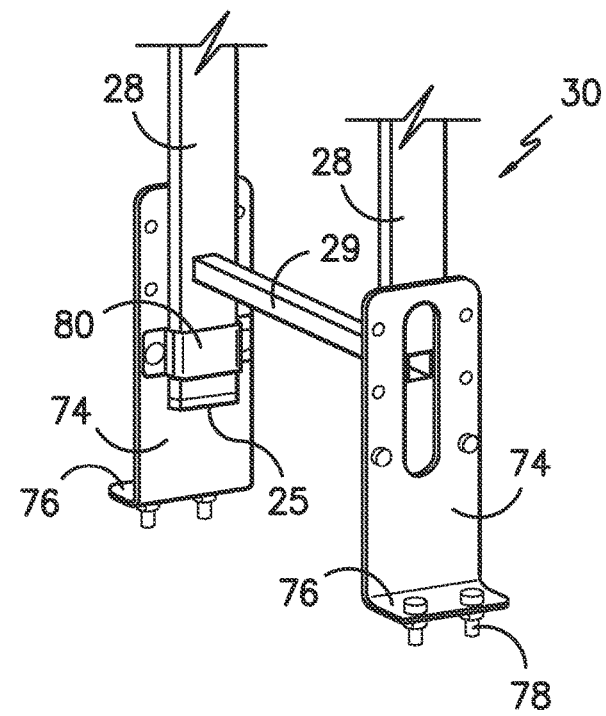
FIG. -5-

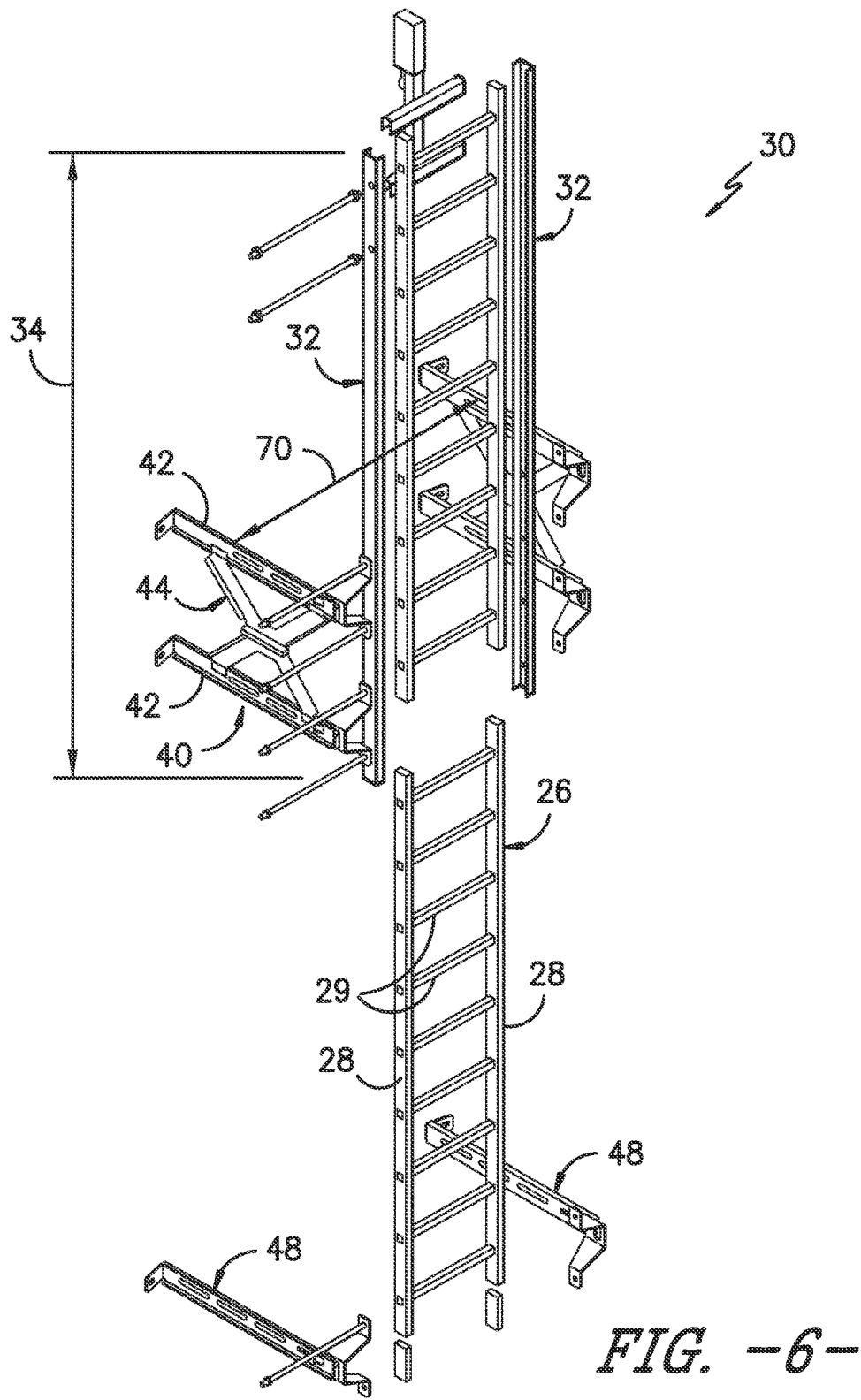
FIG. -6-

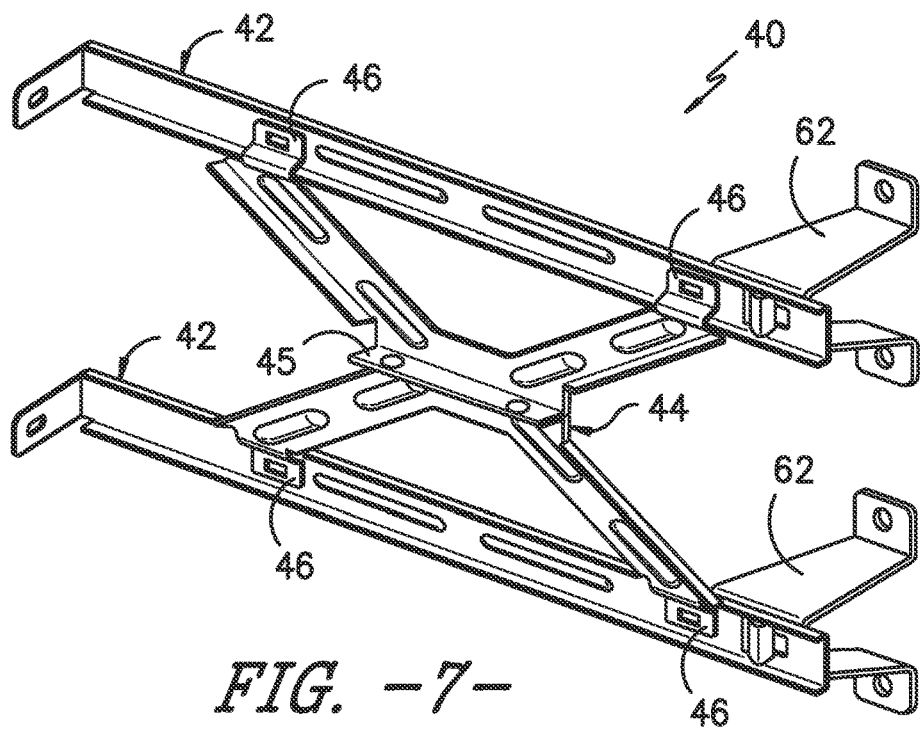
FIG. -7-
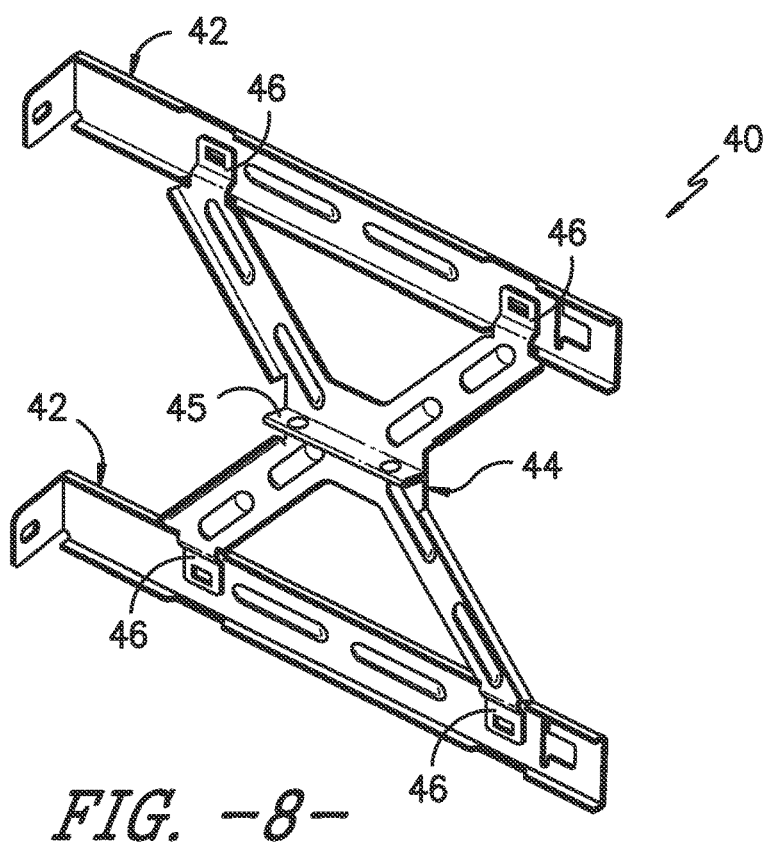
FIG. -8-

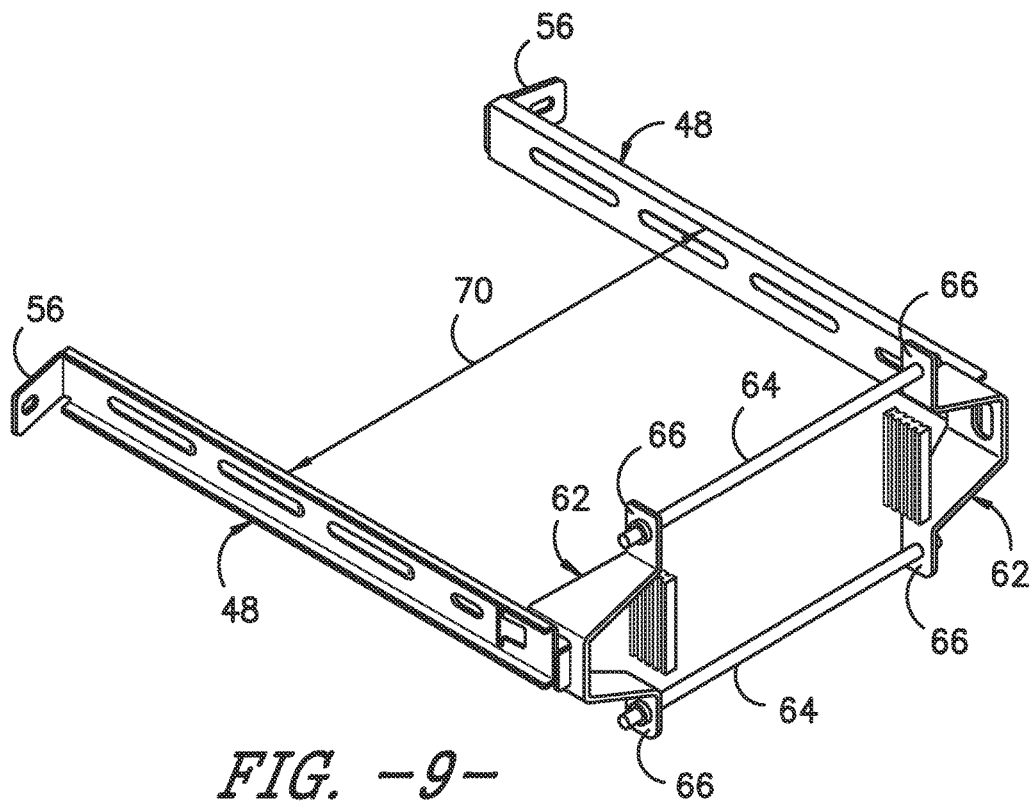
FIG. -9-
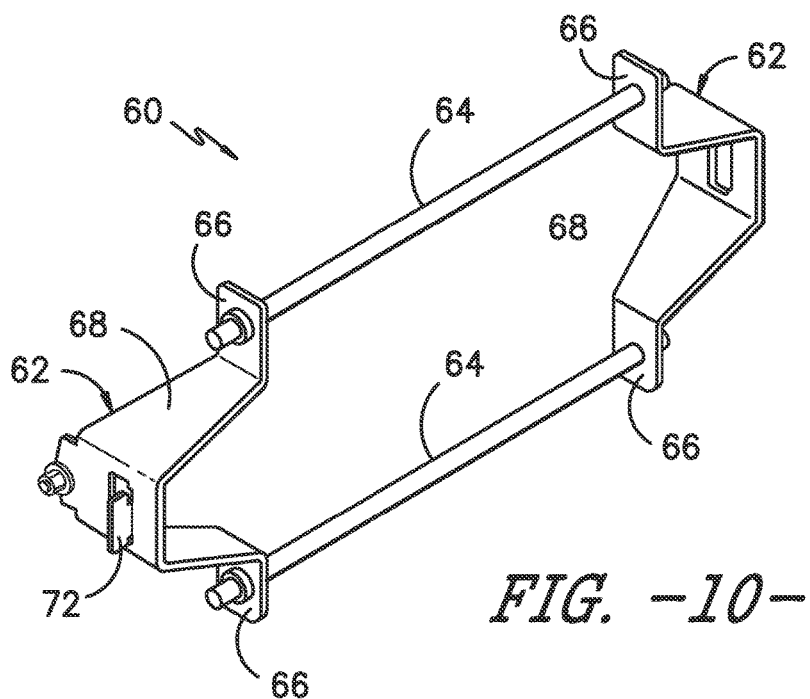
FIG. -10-

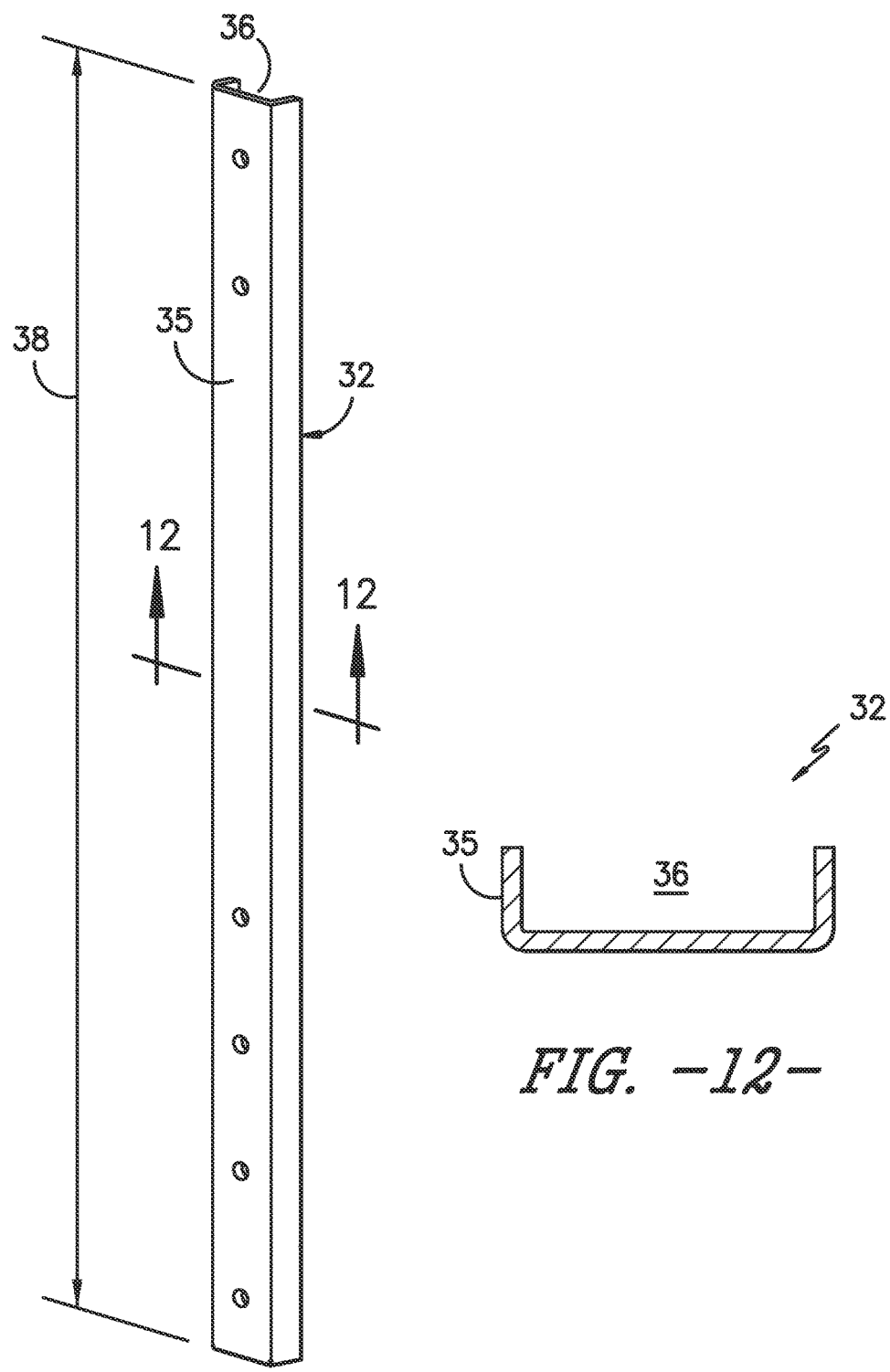
FIG. -11-
FIG. -12-

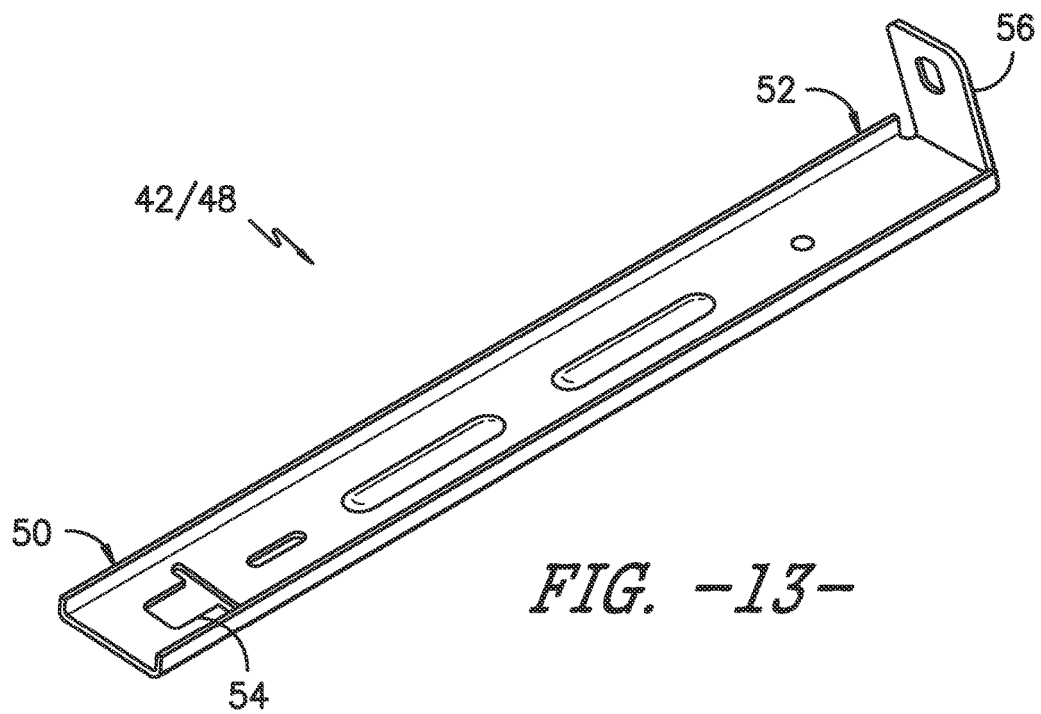
FIG. -13-
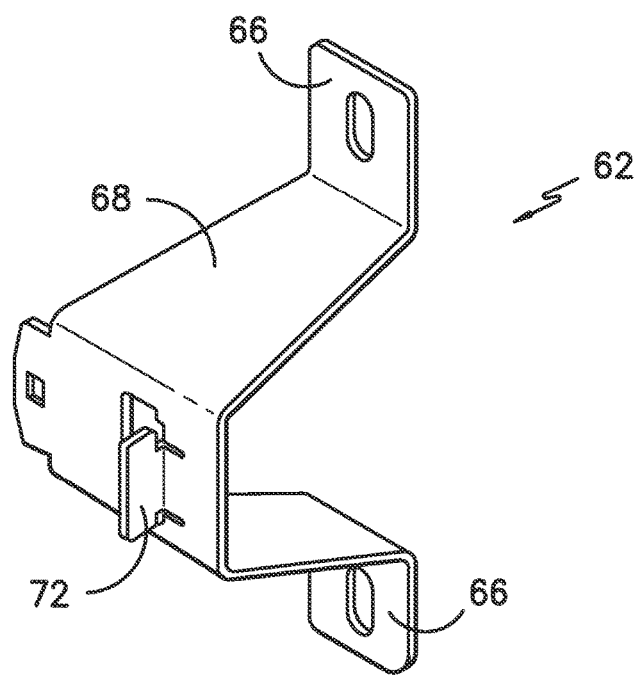
FIG. -14-

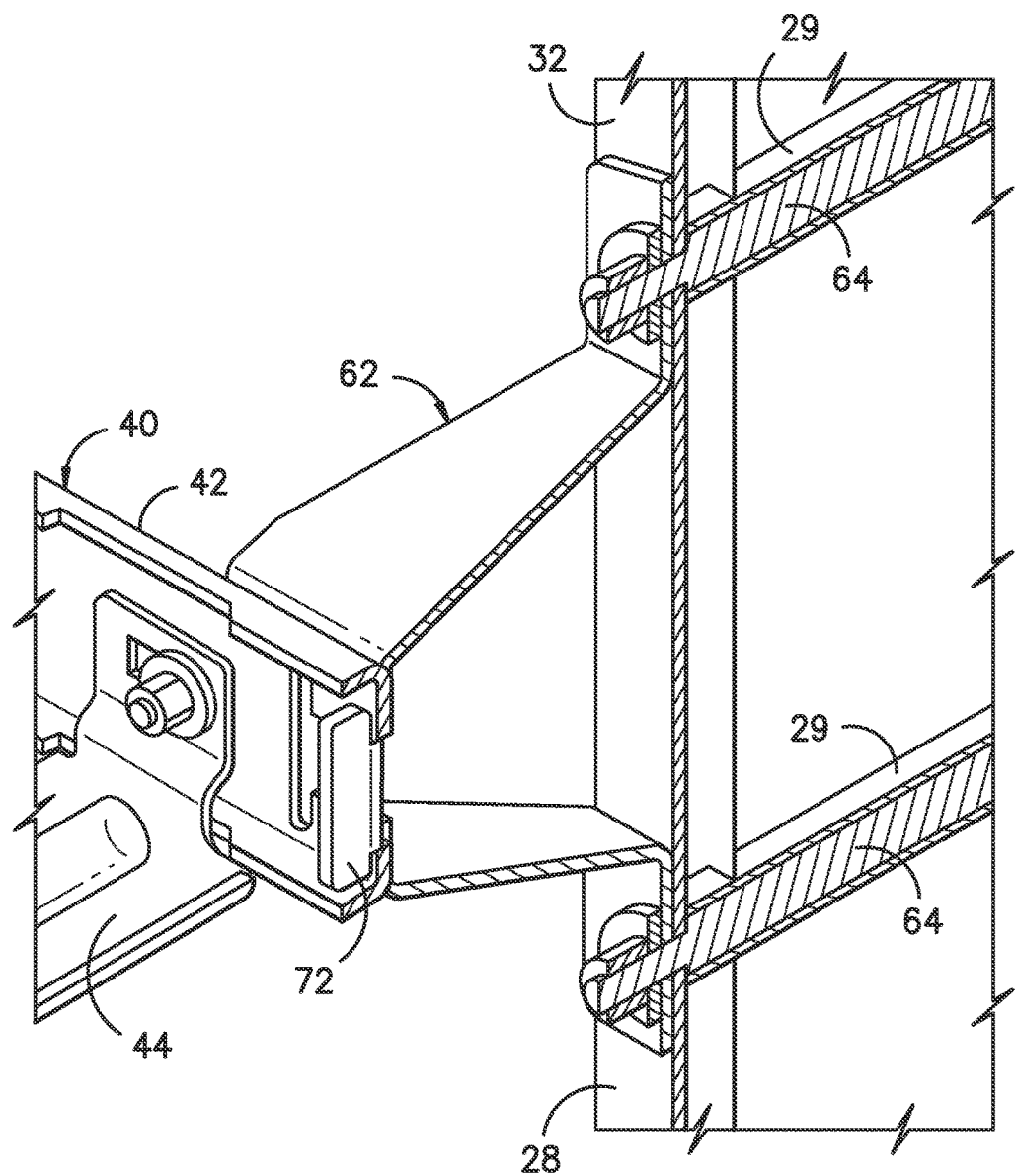
FIG. -15-

LADDER ATTACHMENT SYSTEM FOR A WIND TURBINE

FIELD OF THE INVENTION

The present subject matter relates generally to wind turbines and, more particularly, to a ladder attachment system for a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a nacelle mounted atop the tower, a generator, a gearbox, and a rotor including one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Large wind turbines can reach a height of more than 100 meters. Thus, many wind turbines include ladders, platforms, lifts, and the like for providing access to the nacelle for carrying out maintenance and/or repair services. Ladders are typically fixed to the inner tower wall to avoid excessive movement. For example, in some wind turbines, known ladders are secured to the tower wall using mechanical fasteners. More specifically, certain wind turbines utilize clamp brackets for securing the ladder to the tower wall. For example, the clamp brackets are compressed around the ladder rail and bolted to the heavy bar stock brackets. However, such clamp brackets are not load bearing and do not provide a tie-off location for rescue operations.

In light of the above, improved attachment systems for wind turbine ladders would be desired in the art. For example, a load-bearing ladder attachment system for securing a ladder within a tower of a wind turbine would be advantageous.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a ladder attachment system for securing a ladder within a tower of a wind turbine is disclosed. The ladder has parallel legs and a plurality of rungs arranged substantially perpendicularly between the parallel legs. The ladder attachment system includes at least one external stiffener configured at a top end of each of the parallel legs. Each of the external stiffeners includes a longitudinal body having an open cross-section configured to receive one of the parallel legs along a length thereof. Further, the ladder attachment system also includes a load-bearing bracket assembly configured with each of the external stiffeners. In addition, the ladder attachment system includes at least one support arm arranged in a horizontal plane and configured with each of the parallel legs, with the support arms being spaced apart from the load-bearing bracket assembly along a height of the ladder.

In one embodiment, the external stiffeners may extend from the top edge of the ladder and stop or end before a bottom edge of the ladder. In another embodiment, the ladder attachment system may include a plurality of support arms configured beneath the load-bearing bracket assembly with each of the parallel legs. More specifically, in certain embodiments, the number of support arms used to support the ladder may be determined as a function of the height of the ladder.

In further embodiments, each of the load-bearing bracket assemblies may include at least two parallel arms arranged in a vertical plane with a load-bearing bracket configured between the parallel arms. More specifically, in certain embodiments, the load-bearing bracket may include an X-shaped cross-section or configuration.

In another embodiment, each of the parallel arms and the support arms may be similarly configured. For example, each of the parallel arms and the support arms may include a first end and a second end. Thus, in certain embodiments, the first ends of the arms each may each include a slot. More specifically, in particular embodiments, the slots of the first ends of at least one of the parallel arms or the support arms may be T-shaped, e.g. so as to receive at least a portion of the connections which are further discussed below.

In additional embodiments, the ladder attachment system may include a plurality of spacer assemblies. Each spacer assembly may include opposing connectors configured to secure at least one of the parallel arms or the support arms to one of the parallel legs. Thus, the opposing connectors may be secured together via a plurality of support members that fit within the rungs of the ladder. More specifically in certain embodiments, the support members may include threaded rods.

In certain embodiments, each of the connectors may include opposing flanges separated by a spacer portion. Thus, the spacer portion is configured to provide an increased clearance between at least one of opposing load-bearing bracket assemblies or opposing support arms. As used herein, "opposing" load-bearing bracket assemblies and "opposing" support arms generally refers to arms on opposing parallel legs, i.e. arms located on opposite sides of the ladder. Further, the opposing flanges are configured for mounting the connectors to one of the parallel legs. In further embodiments, the spacer portions of the connectors may include a bent flange configured to fit within the slots of the first ends of at least one of the parallel arms or the support arms. As such, the connectors may be secured to the first ends via the bent flange.

In still another embodiment, the second ends of at least one of the parallel arms or the support arms may include a flange configured for mounting at least one of the parallel arms or the support arms to an internal surface or wall of the tower. Thus, in certain embodiments, the flange may extend substantially outward from at least one of the parallel arms or the support arms with respect to the ladder (e.g. so as to correspond with the contour of the tower wall) so as to provide an increased clearance between at least one of opposing load-bearing bracket assemblies or opposing support arms.

In another aspect, the present disclosure is directed to a ladder attachment system for securing a ladder within a tower of a wind turbine. The ladder has parallel legs and a plurality of rungs arranged substantially perpendicularly between the parallel legs. The ladder attachment system includes at least one external stiffener configured at a top end of each of the parallel legs. Further, each of the external stiffeners includes a longitudinal body having an open cross-section configured to receive one of the parallel legs along a length thereof. Further, the ladder attachment system includes a load-bearing bracket assembly configured with each of the external stiffeners. The load-bearing bracket assemblies each include a pair of parallel arms arranged in a vertical plane and a load-bearing bracket arranged between the parallel arms. In addition, the ladder attachment system may include a plurality of pairs of support arms arranged in a horizontal plane, e.g. beneath the load-bearing bracket assemblies. Thus, the pairs of support arms are spaced apart from the load-bearing bracket assemblies along a height of the ladder and mounted to the parallel legs. Moreover, the ladder attachment system may include a plurality of spacer assemblies. Each of the spacer assemblies includes opposing connectors configured to secure at least one of the parallel arms or the support arms to one of the parallel legs. Further, the opposing connectors are secured together via a plurality of support members or rods that fit within the rungs of the ladder, e.g. within a hollow cross-section of the rungs.

In yet another aspect, the present disclosure is directed to a ladder assembly for a tower of a wind turbine. The ladder assembly includes a ladder and a ladder attachment system for securing the ladder to an internal surface of the tower. The ladder has parallel legs and a plurality of rungs arranged substantially perpendicularly between the parallel legs. The ladder attachment system includes at least one external stiffener configured at a top end of each of the parallel legs. Each of the external stiffeners includes a longitudinal body having an open cross-section configured to receive one of the parallel legs along a length thereof. Further, the ladder attachment system also includes a load-bearing bracket assembly configured with each of the external stiffeners. In addition, the ladder attachment system includes at least one support arm arranged in a horizontal plane and configured with each of the parallel legs, with the support arms being spaced apart from the load-bearing bracket assembly along a height of the ladder.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates an internal, perspective view of one embodiment of a tower having a ladder secured with the tower via a ladder attachment system according to the present disclosure;

FIG. 3 illustrates a detailed view of a top portion of FIG. 2;

FIG. 4 illustrates another detailed view of an intermediate portion of FIG. 2;

FIG. 5 illustrates yet another detailed view of a bottom portion of FIG. 2;

FIG. 6 illustrates an exploded view of one embodiment of a ladder attachment system for securing a ladder within a tower of a wind turbine according to the present disclosure;

FIG. 7 illustrates a perspective view of one embodiment of a load-bearing bracket assembly coupled with corresponding connectors of a ladder attachment system for securing a ladder within a tower of a wind turbine according to the present disclosure;

FIG. 8 illustrates a perspective view of another embodiment of a load-bearing bracket assembly of a ladder attachment system for securing a ladder within a tower of a wind turbine according to the present disclosure;

FIG. 9 illustrates a perspective view of one embodiment of a pair of support arms coupled together via a spacer assembly of a ladder attachment system for securing a ladder within a tower of a wind turbine according to the present disclosure;

FIG. 10 illustrates a perspective view of one embodiment of a spacer assembly of a ladder attachment system for securing a ladder within a tower of a wind turbine according to the present disclosure;

FIG. 11 illustrates a perspective view of one embodiment of an external spacer of a ladder attachment system for securing a ladder within a tower of a wind turbine according to the present disclosure;

FIG. 12 illustrates a cross-sectional view of the external spacer of FIG. 11 along line 12-12;

FIG. 13 illustrates a perspective view of one embodiment of an arm (e.g. one of the parallel arms or one of the support arms) of a ladder attachment system for securing a ladder within a tower of a wind turbine according to the present disclosure;

FIG. 14 illustrates a perspective view of one embodiment of a connector of a ladder attachment system for securing a ladder within a tower of a wind turbine according to the present disclosure; and FIG. 15 illustrates a perspective view of one embodiment of a load-bearing assembly mounted to one of the parallel legs of the ladder via a connector of a ladder attachment system according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a load-bearing ladder attachment system for securing a ladder within a tower of a wind turbine is disclosed. The ladders described herein generally have parallel legs and a plurality of rungs arranged substantially perpendicularly between the parallel legs. The ladder attachment system includes at least one external stiffener configured at a top end of each of the parallel legs of the ladder, a load-bearing bracket assembly configured with each of the external stiffeners, and at least one pair of support arms configured with the parallel legs. More specifically, each of the external stiffeners includes a longitudinal body having an open cross-section configured to receive one of the parallel legs along a length thereof. Further, the ladder attachment system also includes a load-bearing bracket assembly configured with each of the external stiffeners. In addition, the ladder attachment system includes at least one support arm arranged in a horizontal plane and configured with each of the parallel legs, with the support arms being spaced apart from the load-bearing bracket assembly along a height of the ladder.

Thus, the present disclosure provides many advantages not present in the prior art. For example, the load-bearing bracket assemblies of the ladder attachment system provide load-bearing capabilities that are otherwise not present in the prior art. Further, the ladder attachment system provides a light-weight design. In addition, the ladder attachment system provides reinforcement to the ladder rungs, e.g. via the support members, and external stiffness to the top of the ladder. Moreover, the ladder attachment system is flexible and can be used with new and existing ladder designs.

Referring to the drawings, FIG. 1 illustrates a perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to the nacelle 16, which encloses an electric generator (not shown) to permit electrical energy to be produced. The tower 12 may also include a plurality of tower sections 24 assembled atop one another. The tower 12 may be made of any number of tower sections 24. For example, in the illustrated embodiment, the tower 12 includes four tower sections 24.

Referring now to FIG. 2, the wind turbine 10 may also include at least one ladder 26 mounted within the tower 12 to provide operators safe access to areas of the wind turbine 10 that may require servicing, maintenance, and/or inspection. The ladder 26 described herein may include any suitable ladder now known or later developed in the art. For purposes of discussion, the ladder 26 as described herein generally has parallel legs 28 and a plurality of rungs 29 arranged substantially perpendicularly between the parallel legs 28. In addition, as shown generally in FIGS. 2-15, various views of multiple embodiments of a ladder attachment system 30 for securing the ladder 26 within the tower 12 of the wind turbine 10 are illustrated. More specifically, FIG. 3 illustrates the top portion of the ladder 26, FIG. 4 illustrates a middle portion of the ladder 26, and FIG. 5 illustrates a bottom portion of the ladder 26. As shown particularly in FIGS. 3, 6, 11-12, and 15, the ladder attachment system 30 may include at least one external stiffener 32 configured at a top end 34 of each of the parallel legs 28. For example, as shown in FIGS. 11-12, each of the external stiffeners 32 may include a longitudinal body 35 having an open cross-section 36 configured to receive one of the parallel legs 28 along a length 38 thereof. Thus, the external stiffeners 32 are configured to fit around at least a portion of an outer surface of each of the parallel legs 28.

Further, the top end 34 of the parallel legs 28 may include any suitable length of the ladder 26. For example, in one embodiment, the top end 34 may correspond to about the upper ten (10) feet of the parallel legs 28, e.g. as measured from a top edge 27 of the ladder 26. More preferably, the top end 34 may include from about seven (7) feet to about eight (8) feet as measured from the top edge 27 of the ladder 26. In still additional embodiments, the external stiffeners 32 may extend any suitable length starting from the top edge 27 of the ladder 26 and ending before a bottom edge 25 of the ladder 26.

Referring now to FIGS. 2-3 and 6-8, the ladder attachment system 30 may also include a load-bearing bracket assembly 40 configured with each of the external stiffeners 32. For example, as shown, each of the load-bearing bracket assemblies 40 may include a pair of parallel arms 42 arranged in a vertical plane (i.e. one above the other as shown in FIGS. 7-8) and a load-bearing bracket 44 arranged between the vertically-spaced parallel arms 42. More specifically, as shown generally in the figures, the load-bearing bracket 44 may include an X-shaped cross-section or configuration. Further, the X-shaped load-bearing bracket 44 may be constructed of a single piece of material or may be segmented. For example, as shown in FIGS. 7 and 8, the load-bearing bracket 44 includes two segments joined together at a seam 45 or flange. In addition, as shown, the load-bearing bracket 44 may include one or more end flanges 46 for securing the bracket 44 to the parallel arms 42.

Referring now to FIGS. 2, 4, 6, and 9, the ladder attachment system 30 may also include at least one support arm 48 configured with each of the parallel legs 28, e.g. in a generally horizontal plane (i.e. one beside the other as shown in FIGS. 4 and 9). More specifically, as shown, the support arms 48 may be spaced apart from the load-bearing bracket assembly 40 along a height of the ladder 26. In certain embodiments, as shown in FIG. 2, the ladder attachment system 30 may include a plurality of support arms 48 configured beneath the load-bearing bracket assembly 40 with each of the parallel legs 28. Thus, in certain embodiments, the number of support arms 48 used to support the ladder 26 may be determined as a function of the height of the ladder 26. For example, as shown in FIG. 2, the ladder attachment system 30 includes a total of ten (10) pairs of support arms 48. In additional embodiments, the ladder attachment system 30 may include more than ten or less than ten support arms 48.

In addition, the parallel arms 42 of the load-bearing bracket assemblies 40 and the support arms 48 may include similar features. For example, as shown in FIG. 13, the arms 42, 48 may include a first end 50 and a second end 52. More specifically, as shown in the illustrated embodiment, the first ends 50 of the arms 42, 48 may each include a slot 54. More specifically, in particular embodiments, the slots 54 of the first ends 50 of the arms 42, 48 may be T-shaped. In further embodiments, the slot 54 may include any other suitable shape. In addition, as shown, the second ends 52 of the arms 42, 48 may include a flange 56 (e.g. a substantially L-shaped flange) configured for mounting the arms 42, 48 to an internal surface of the tower 12. Thus, in certain embodiments as shown in FIG. 9, the flange 56 of each arm may extend substantially outward from arm(s) 42, 48 with respect to the ladder 26 (e.g. so as to correspond with the contour of the tower wall) so as to provide an increased clearance between opposing load-bearing bracket assemblies 40 and opposing support arms 48, depending on the arms use.

Referring now particularly to FIG. 10, the ladder attachment system 30 may also include at least one spacer assembly 60. For example, as shown, each spacer assembly 60 may include opposing connectors 62 configured to secure the parallel arms 42 and/or the support arms 48 to one of the parallel legs 28. As used herein, the term "opposing" generally refers to components configured with opposite parallel legs 28. In certain embodiments, as shown in FIGS. 9-10 and 14, each of the connectors 62 may include opposing flanges 66 separated by a spacer portion 68. Thus, the spacer portion 68 is configured to provide an increased clearance 70 between opposing load-bearing bracket assemblies 40 (FIG. 6) and/or opposing support arms 48 (FIG. 9). Further, the opposing flanges 66 are configured for mounting the connectors 62 to one of the parallel legs 28, e.g. via one or more fasteners.

In addition, as shown in FIG. 14, the spacer portions 68 of the connectors 62 may include a bent flange 72 configured to fit within the slots 54 of the first ends 50 of the arms 42, 48 As such, the connectors 62 may be secured to the first ends 50 via the bent flange 72. More specifically, the bent flange 72 may be inserted into the T-shaped slot 54 and slid in place such that the bent flange 72 is secured within the slot 54. Such a connection can provide additional load-bearing capabilities to the ladder attachment system 30.

In addition, as shown in FIGS. 9, 10, and 15, the opposing connectors 62 may be secured together via one or more support members 64 that fit within the rungs 29 of the ladder 26. More specifically, in certain embodiments, the rungs 29 of the ladder 26 typically have a hollow cross-section, e.g. a hollow square cross-section. As such, the support members 64 can be inserted into the hollow rungs 29 of the ladder 26, e.g. as shown in FIG. 15. In addition, in certain embodiments, the support members 64 may include threaded rods. Thus, as shown in FIGS. 10 and 15, the ends of the threaded support members 62 may be fastened to the connectors 62 so as to provide reinforcement to the ladder rungs 29.

In addition, as shown in FIG. 5, the bottom portion of the ladder 26 may have any suitable configuration. For example, as shown, each of the parallel legs 28 may be supported by a bracket 74 having a flange 76 or footing that can be mounted to the base of the tower 12 so as to provide further support to the ladder 26. More specifically, as shown, the flanges 76 may be mounted to the base of the tower 12 via one or more fasteners. In addition, as shown, the parallel legs 28 of the ladder 26 may be secured to the brackets 74 using any suitable means. For example, as shown, each of the parallel legs 28 is secured within each bracket 74 via a clamp 80.

It should be understood that the various components of the ladder attachment system 30 may be constructed of any suitable materials. For example, in certain embodiments, the materials of construction may include any suitable metal, such as stainless steel, aluminum, or similar, or combinations thereof. More specifically, in certain embodiments, the external stiffeners 32, parallel legs 28, support arm 48, parallel arms 42, and/or the spacer assemblies 60 may be constructed of stainless steel, whereas the ladder 26 may be constructed of aluminum. Further, the hardware components may be constructed of carbon steel e.g. that is quenched and tempered.

In addition, the various components may be coated with one or more suitable coatings. For example, in one embodiment, one or more components of the ladder attachment system 30 may be coated with an anti-rust protection coating. In addition, in another embodiment, one or more components of the ladder attachment system 30 may be coated with a corrosion protection coating.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A ladder attachment system for securing a ladder within a tower of a wind turbine, the ladder having parallel legs and a plurality of rungs arranged substantially perpendicularly between the parallel legs, the ladder attachment system comprising:
   at least one external stiffener configured at a top end of each of the parallel legs, each of the external stiffeners comprising a longitudinal body having an open cross-section configured to receive one of the parallel legs along a length thereof;
   a load-bearing bracket assembly configured to connect to each of the external stiffeners;
   a pair of parallel support arms configured to connect to each of the parallel legs, the support arms being arranged in a substantially horizontal plane and spaced apart from the load-bearing bracket assembly along a height of the ladder; and,
   a spacer assembly secured between the pair of parallel support arms or load bearing bracket assembly, each spacer assembly comprising a pair of opposing connectors, each of the opposing connectors secured between one of the support arms or load bearing bracket assembly and one of the parallel legs, each of the opposing connectors comprising opposing flanges separated by a spacer portion, the opposing flanges being arranged in a substantially vertical plane that aligns with ends of the parallel legs of the ladder, the spacer portion forming an open area between one of the support arms and one of the parallel legs to provide an increased clearance between at least one of opposing load-bearing bracket assemblies or opposing support arms and the ladder.

2. The ladder attachment system of claim 1, wherein each of the external stiffeners extends from a top edge of the ladder and ends before a bottom edge of the ladder.

3. The ladder attachment system of claim 1, further comprising a plurality of pairs of the at least one support arm mounted to the parallel legs beneath the load-bearing bracket assembly, a number of pairs of the at least one support arm being determined as a function of the height of the ladder.

4. The ladder attachment system of claim 1, wherein each of the load-bearing bracket assemblies further comprises a pair of parallel arms arranged in a substantially vertical plane and a load-bearing bracket arranged between the parallel arms.

5. The ladder attachment system of claim 4, wherein the load-bearing bracket comprises an X-shaped cross-section.

6. The ladder attachment system of claim 4, wherein each of the parallel arms and the support arms comprise a first end and a second end, the first ends of the arms each comprising a slot.

7. The ladder attachment system of claim 6, wherein the second ends of at least one of the parallel arms or the support arms further comprise a flange configured for mounting at least one of the parallel arms or the support arms to an internal surface of the tower.

8. The ladder attachment system of claim 7, wherein the flange extends substantially outward from at least one of the parallel arms or the support arms with respect to the ladder so as to provide an increased clearance between at least one of opposing load-bearing bracket assemblies or opposing support arms.

9. The ladder attachment system of claim 1, wherein the opposing flanges are configured for mounting the opposing connectors to one of the parallel legs.

10. The ladder attachment system of claim 9, wherein the spacer portions of the opposing connectors define a top surface comprising a bent flange configured to fit within one of the slots of the first ends of at least one of the parallel arms or the support arms, the bent flanges extending away from each other.

11. The ladder attached system of claim 10, wherein the slots of the first ends of at least one of the parallel arms or the support arms are T-shaped.

12. The ladder attachment system of claim 1, wherein the support members comprise threaded rods.

13. A ladder attachment system for securing a ladder within a tower of a wind turbine, the ladder having parallel legs and a plurality of rungs arranged perpendicularly between the parallel legs, the ladder attachment system comprising:
at least one external stiffener configured at a top end of each of the parallel legs, each of the external stiffeners comprising a longitudinal body having an open cross-section configured to receive one of the parallel legs along a length thereof;
a load-bearing bracket assembly configured to connect to each of the external stiffeners, each of the load-bearing bracket assemblies further comprising at least two parallel arms and a load-bearing bracket arranged between the parallel arms;
a plurality of pairs of support arms mounted to the parallel legs beneath each of the load-bearing bracket assemblies, the pairs of support arms spaced apart from the load-bearing bracket assembly along a height of the ladder; and,
a plurality of spacer assemblies each comprising opposing connectors configured to secure at least one of the parallel arms or the support arms to one of the parallel legs, each of the opposing connectors comprising opposing flanges separated by a spacer portion, the opposing flanges being arranged in a substantially vertical plane that aligns with ends of the parallel legs of the ladder, the spacer portion forming an open area between one of the support arms and one of the parallel legs to provide an increased clearance between at least one of opposing load-bearing bracket assemblies or opposing support arms, the opposing connectors being secured together via a plurality of support members that fit within the rungs of the ladder.

14. A ladder assembly for a tower of a wind turbine, the ladder assembly comprising:
a ladder comprising parallel legs and a plurality of rungs arranged perpendicularly between the parallel legs;
a ladder attachment system for securing the ladder to an internal surface of the tower, the ladder attachment system comprising:
at least one external stiffener secured at a top end of each of the parallel legs, each of the external stiffeners comprising a longitudinal body having an open cross-section that receives one of the parallel legs along a length thereof,
a load-bearing bracket assembly secured to a respective one of the external stiffeners,
a pair of parallel support arms configured to connect with the parallel legs, the pairs of support arms being arranged in a substantially horizontal plane and spaced apart from the load-bearing bracket assembly along a height of the ladder, and
a spacer assembly secured between the pair of parallel support arms or load bearing bracket assembly, each spacer assembly comprising a pair of opposing connectors, each of the opposing connectors secured between one of the support arms or load bearing bracket assembly and one of the parallel legs, each of the opposing connectors comprising opposing flanges separated by a spacer portion, the opposing flanges being arranged in a substantially vertical plane that aligns with ends of the parallel legs of the ladder, the spacer portion forming an open area between one of the support arms and one of the parallel legs to provide an increased clearance between at least one of opposing load-bearing bracket assemblies or opposing support arms and at least one of the parallel legs of the ladder.

15. The ladder assembly of claim 14, wherein each of the load-bearing bracket assemblies further comprises a pair of parallel arms arranged in a substantially vertical plane and a load-bearing bracket arranged between the parallel arms, the load-bearing bracket comprising an X-shaped cross-section, each of the parallel arms and the pair of support arms comprising a first end and a second end, the first ends of the arms each comprising a slot.

16. The ladder assembly of claim 15, wherein the opposing connectors are secured together via a plurality of support members that fit within the rungs of the ladder.

17. The ladder assembly of claim 16, wherein the opposing flanges are configured for mounting the opposing connectors to one of the parallel legs.

18. The ladder assembly of claim 17, wherein the spacer portions of the opposing connectors define a top surface comprising a bent flange configured to fit within one of the slots of the first ends of at least one of the parallel arms or the support arms, the bent flanges extending away from each other.

19. The ladder assembly of claim 15, wherein the second ends of at least one of the parallel arms or the support arms further comprise a flange configured for mounting at least one of the parallel arms or the support arms to an internal surface of the tower, wherein the flange extends substantially outward from at least one of the parallel arms or the support arms with respect to the ladder so as to provide an increased clearance between at least one of opposing load-bearing bracket assemblies or opposing support arms.

* * * * *